United States Patent
Campbell

[11] 3,970,334
[45] July 20, 1976

[54] CONNECTORS FOR COUPLING METERS WITH METER BARS

[75] Inventor: Max L. Campbell, Topeka, Kans.

[73] Assignee: Hydro-Flex Corporation, Inc., Topeka, Kans.

[22] Filed: Mar. 14, 1975

[21] Appl. No.: 558,229

[52] U.S. Cl. .................................. 285/30; 73/201; 285/61; 285/226
[51] Int. Cl.² ...................... F16L 3/22; F16L 51/02
[58] Field of Search ............... 285/30, 226, 64, 227, 285/228, 229, 299, 300, 301, 61, 62; 73/201

[56] References Cited
UNITED STATES PATENTS

| 282,967 | 8/1883 | Duffy | 285/226 |
| 700,378 | 5/1902 | Schmidt | 285/64 |
| 1,442,625 | 1/1923 | Lyth | 285/226 X |
| 1,891,193 | 12/1932 | Mueller | 285/30 |
| 2,582,249 | 1/1952 | Hendel | 285/226 |
| 3,061,039 | 10/1962 | Peters | 285/229 X |
| 3,187,570 | 6/1965 | Mueller | 73/201 |
| 3,743,328 | 7/1973 | Longfellow | 285/226 |
| 3,860,978 | 1/1975 | Wirth | 285/157 X |
| 3,873,137 | 3/1975 | Yamaguchi | 285/226 |

FOREIGN PATENTS OR APPLICATIONS

| 786,263 | 6/1935 | France | 285/226 |
| 610,814 | 10/1960 | Italy | 285/354 |
| 278,361 | 1/1952 | Switzerland | 285/226 |
| 353,520 | 7/1931 | United Kingdom | 285/226 |

Primary Examiner—Thomas F. Callaghan
Attorney, Agent, or Firm—Schmidt, Johnson, Hovey & Williams

[57] ABSTRACT

A flexible coupling tube corrects misalignment between gas meter and corresponding meter bar connections. The combination of meter bar and flexible coupling allows use of a single size meter bar for any gas meter installation. Potential damage to meter installations from external shock loads is reduced by the shock-absorbing properties of the flexible couplings.

1 Claim, 4 Drawing Figures

U.S. Patent July 20, 1976 3,970,334
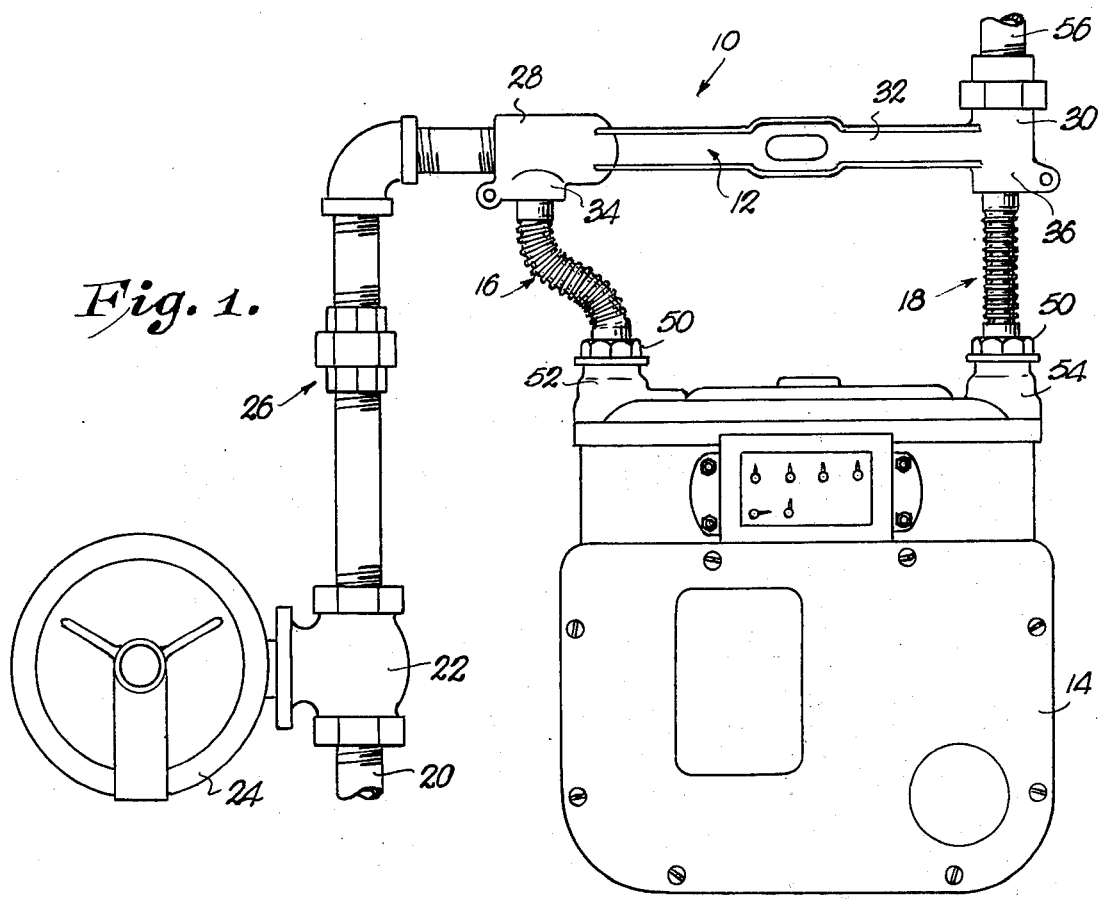
Fig. 1.
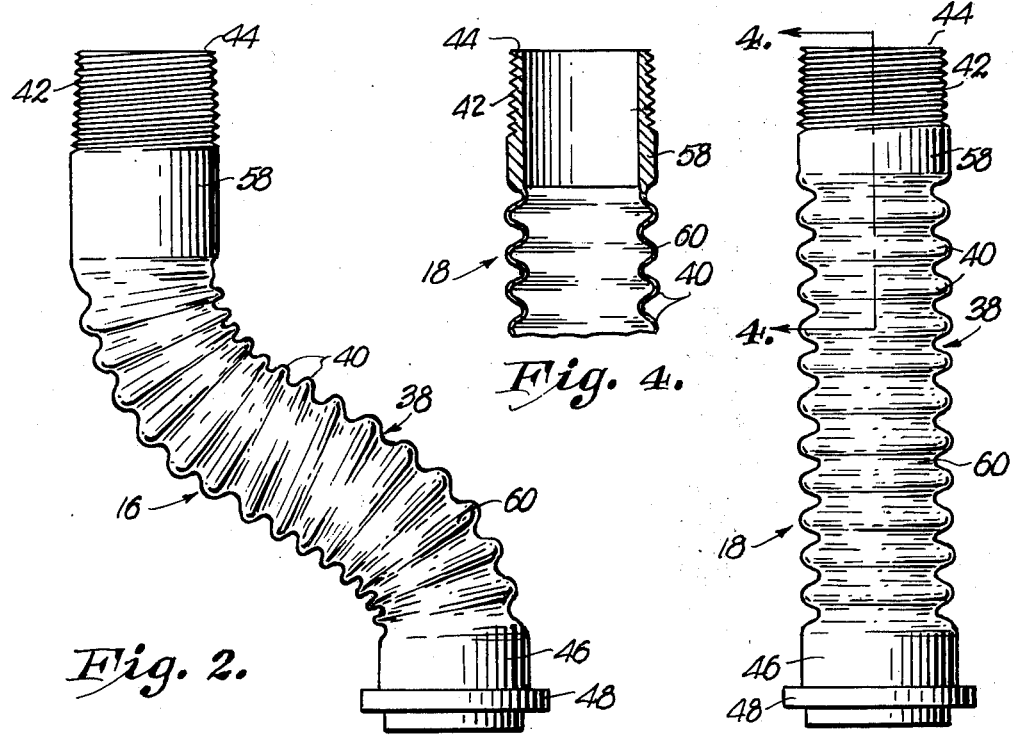
Fig. 2.
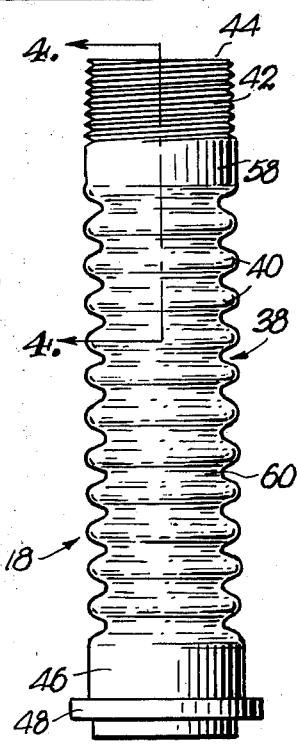
Fig. 3.
Fig. 4.

CONNECTORS FOR COUPLING METERS WITH METER BARS

This invention relates to gas meter installation assemblies which are commonly found in residential and commercial buildings using natural gas as a fuel supply. Such installations are typically located outside these buildings adjacent or near the foundation thereof, and generally consist of a gas regulator, gas meter and interconnecting members.

It has commonly been the practice to incorporate a meter bar in gas meter installation assemblies to eliminate the need for various connecting members and to provide a supporting means for the gas meter. Meter bars are well-known in the art and usually comprise two segregated chambers having a lateral access and a lower access, and a rigid bar supporting the chambers. A common problem with the use of meter bars is the necessity of stocking many sizes of these bars to accommodate interconnection with various sizes of gas meters. This requires the installing contractors to maintain a high inventory of meter bars and poses problems in matching correct size meter bars to a corresponding meter. Obviously, this large inventory is undesirable to the contractor because it forces him to commit additional capital to his inventory. Likewise, the plurality of meter bar sizes is undesirable because costly delays in installation often occur when a wrong size meter bar is mistakenly delivered or ordered.

Another problem with gas meter installation assemblies is their vulnerability to external shock loads. These external shocks may be caused by collisions with lawn mowers, garden tractors, or other yard vehicles commonly found in use around residental and commercial buildings. Moreover, since many gas meters for commercial buildings are located within or near parking lots, these meters are also subject to collision damage from automobiles. In most installations the meter extends furthermost from the installation assembly and generally receives any accidental shocks that may be imparted to the system. These shocks are transmitted through the meter into the connecting members often causing damage to connections or the members themselves. This, of course, results in undesirable gas leakage and considerable repair expense.

Accordingly, one important object of the present invention is to provide a means by which a universal meter bar may be used with all gas meter sizes.

Another important object of the present invention is to provide a shock-absorbing mounting means whereby energy from external shock forces is dissipated without damage to the meter assembly.

Yet another important object of the invention is to provide economical means for achieving the aforementioned objects.

In the drawing:

FIG. 1 is a fragmentary, front elevational view of a gas meter assembly in accordance with the present invention and corresponding gas regulator;

FIG. 2 is an enlarged elevational view of one flexible tubular member of the assembly in a laterally deformed position;

FIG. 3 is an enlarged elevational view of the other tubular member in its normal in-line position; and FIG. 4 is a fragmentary, sectional view taken along line 4—4 of FIG. 3.

Referring to FIG. 1, a gas meter assembly is broadly designated by the numeral 10 and is comprised of a meter bar 12, a gas meter 14, and interconnecting tubular members 16 and 18. Also in FIG. 1 there is shown a conventional gas regulator 24 which forms no part of the present invention.

Gas line 20 leads from a natural gas source (not shown) and interconnects with a T-shaped member 22. Gas regulator 24 is mounted to member 22 and disposed laterally thereof. T-shaped member 22 communicates with meter bar 12 through a connector pipe assembly 26. Meter bar 12 comprises an inlet 28 in spaced-apart relationship with an outlet 30, an elongated support beam 32 intermediate said inlet 28 and said outlet 30 and rigidly affixed thereto, and a first meter port 34 and a second meter port 36 communicating respectively with the inlet 28 and outlet 30. The ports 34 and 36 are cylindrical in configuration and are internally threaded with tapered pipe threads for receiving mating pipe threads 42 on tubular members 16 and 18.

Members 16 and 18 are elongated tubes having flexible central sections 38 containing a series of interconnected, axially aligned annular corrugations 40 along the lengths thereof, meter bar ends 44 with the pipe threads 42, and meter ends 46 containing annular shoulders 48 for cooperating with meter nuts 50 provided on meter 14 at gas entry 52 and gas exit 54 to form a sealed connection therewith. As shown in FIG. 4, the wall 58 of bar end 44 is thicker than corrugated wall 60 of central section 38. Similarly, the wall of meter end 46 is also thicker than corrugated wall 60. This structure confines flexure and shock-absorbing action to central section 38, thereby protecting the sealed connections at the bar end 44 and meter end 46.

In use, gas meter assembly 10 is installed between connector pipe assembly 26 and gas delivery conduit 56 by first interconnecting meter bar 12 therebetween and then connecting meter 14 to meter bar 12 using flexible members 16 and 18. If the spacing between ports 34 and 36 corresponds to the spacing between gas entry 52 and gas exit 54, both members 16 and 18 are disposed in their normal in-line position as shown by member 18 in FIG. 3. However, if there is misalignment between ports 34, 36 and entry 52 and exit 54, one or both of the members 16 and 18 is laterally deformed to compensate for such misalignment. Thus, a meter bar having a fixed spacing between its ports can be used to accommodate any size gas meter when interconnected by flexible tubular members such as members 16 and 18 of the present invention.

The members 16 and 18 also serve as shock absorbers for the completed installation. A shock force received by the meter 14 will be transmitted to members 16 and 18 and absorbed by deflection and compression thereof. Hence, damage to the gas meter installation from external concussions is greatly minimized due to the energy dissipating properties of the flexible members.

It should be noted that the thickness of corrugated wall 60 is of major importance in the disclosed invention. The appropriate thickness depends upon the mechanical properties of the material used to construct section 38. The thickness should be of a dimension such that meter 14 can be supported by members 16 and 18 without extension or yielding of section 38 yet such that deflection or extension of section 38 will occur when a strong manually applied force is imparted to member 16 or 18. This construction provides the necessary flexibility for ease of assembly, yet also presents a rigid supporting structure for meter 14.

It is apparent that the objects are fully satisfied by the present invention. It should be understood that these objects could be accomplished by modifications to the specific embodiment of this invention illustrated herein. For example, one of the interconnecting tubular members could be made inflexible without limiting the versatility of the meter bar. Therefore, this invention includes all embodiments within the scope of the following claims.

Having thus described the invention, what is claimed as new and desired to be secured by Letters Patent patent is:

1. In a gas meter installation assembly, the combination comprising;

a gas volume meter of specific weight and having a gas entry and a gas exit:

a meter bar adapted for mountng on a support and including an inlet adapted to interconnect with a gas source, an outlet spaced from said inlet for interconnection with a gas-delivering conduit and a rigid mounting beam extending between said inlet and outlet, there being first and second gas meter threaded ports within said meter bar communicating respectively with said inlet and said outlet;

first and second elongated, one-piece, integral, open-ended, tubular members interconnecting said meter and said bar to support said meter and to establish fluid communication between the meter and said inlet and outlet respectively, said tubular members each having a thin-walled central section disposed between a pair of opposed end sections, each of said sections having a wall thickness greater than the wall thickness of said central section;

said first tubular member having tapered threads on one of said end sections for engagement with said threads of the first meter port, and a shoulder on the other of said end sections for sealing against said gas entry on said meter;

said second tubular member having tapered threads on one of said end sections for engagement with said threads of the second meter port, and a shoulder on the other of said end sections for sealing against said gas exit on said meter;

nut members clamping said shoulder of each said tubular member in sealing engagement, with said meter;

each of said central sections containing a plurality of interconnected, axially aligned, annular corrugations along the length thereof operable to permit longitudinal and transverse flexure of said members yet preclude significant radial deformation of the same, the internal diameter of said corrugations being substantially equal to the internal diameter of said end sections and the external diameter of said corrugations being substantially equal to the external diameter of said end sections;

said central sections having a wall thickness sufficient to provide a limited degree of rigidity of said flexible members such that the weight of said meter is supported without deformation of the members and further confines flexure and shock absorbing action to the central sections.

* * * * *